(12) United States Patent
Ragupathy et al.

(10) Patent No.: US 10,601,908 B1
(45) Date of Patent: Mar. 24, 2020

(54) PARTITIONING OF CONTAINER WORKLOAD BASED ON A TEMPORAL RELATIONSHIP

(71) Applicant: Cisco Technology, Inc., San Jose, CA (US)

(72) Inventors: Manoj Ragupathy, San Jose, CA (US); Xueqiang Ma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/152,291

(22) Filed: Oct. 4, 2018

(51) Int. Cl.
*H04L 29/08* (2006.01)
*H04L 12/911* (2013.01)
*H04L 12/24* (2006.01)
*G06F 16/22* (2019.01)

(52) U.S. Cl.
CPC ........ *H04L 67/101* (2013.01); *G06F 16/2246* (2019.01); *H04L 41/12* (2013.01); *H04L 41/142* (2013.01); *H04L 47/829* (2013.01)

(58) Field of Classification Search
CPC ..... H04L 67/101; H04L 41/12; H04L 41/142; H04L 47/829; G06F 16/2246
See application file for complete search history.

(56) References Cited

U.S. PATENT DOCUMENTS

| | | | |
|---|---|---|---|
| 6,883,020 B1 * | 4/2005 | Taranto | G06F 16/9574 709/213 |
| 7,844,687 B1 * | 11/2010 | Gelvin | G06F 15/173 709/220 |
| 8,949,810 B2 | 2/2015 | Andrade et al. | |
| 9,805,345 B1 | 10/2017 | Dailianas et al. | |
| 9,870,629 B2 * | 1/2018 | Cardno | G06Q 10/10 |
| 10,204,140 B2 * | 2/2019 | Petride | G06F 16/24553 |
| 2006/0224359 A1 * | 10/2006 | Ashcraft | G06F 8/71 702/182 |
| 2011/0161381 A1 * | 6/2011 | Wang | G06F 16/122 707/814 |
| 2013/0253808 A1 * | 9/2013 | He | G06Q 10/00 701/117 |
| 2017/0126432 A1 | 5/2017 | Padala et al. | |
| 2018/0039238 A1 * | 2/2018 | Gartner | G06F 16/2246 |
| 2018/0046926 A1 | 2/2018 | Achin et al. | |
| 2018/0159745 A1 * | 6/2018 | Byers | H04L 43/08 |

OTHER PUBLICATIONS

Xiong et al., "Economical and Robust Provisioning of N-tier Cloud Workloads a Multi-level", IEEE, dated Jul. 25, 2011, 10 pages.

* cited by examiner

*Primary Examiner* — Arvin Eskandarnia
(74) *Attorney, Agent, or Firm* — Merchant & Gould P.C.

(57) ABSTRACT

For each node in a plurality of nodes corresponding to a particular computer network element, the performance metric data regarding the node based on a first time interval is received. The plurality of nodes is organized in a tree structure which comprises a plurality of spine nodes, a plurality of leaf nodes, a plurality of host nodes, and a plurality of container nodes. The metric data is applied for a recursive partitioning algorithm on the plurality of nodes to generate an allocation strategy for the plurality of container nodes. The allocation strategy defines a topology of the tree structure that maximizes usage of computing resources on each node based on the first time interval.

20 Claims, 4 Drawing Sheets

PARTITIONING OF CONTAINER WORKLOAD BASED ON A TEMPORAL RELATIONSHIP

FIELD OF THE DISCLOSURE

One technical field of the present disclosure is network management including optimization of computing and network resources in diversified data center or cloud computing environments. Another technical field is dynamic deployment of computer application programs. Another technical field is the partitioning of container workload.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer application programs executed in cloud environments are now widely used to deploy large-scale services for large numbers of client computers. As the number of client computers increases and the type of services varies, the number of application programs increases, and the types of application programs vary. For example, computer resources and network resources are expected to use different application programs such as database applications and web applications. However, static deployment of application programs may cause uneven workload distribution due to latency at peak times of use. Furthermore, static deployment may cause overutilization or underutilization of storage, and networking and computing resources.

Consequently, for optimization of networking resources and reduced cloud traffic across a cloud computing platform, assigning evenly distributed workload to network resources while reducing cross traffic between nodes within the network becomes more important in cloud deployments, yet present technology does not offer good solutions to these issues.

BRIEF DESCRIPTION OF THE DRAWINGS

The example embodiment(s) of the present invention is illustrated by way of example, and not in a way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Embodiments are described in sections below according to the following outline:

1. General Overview

Techniques for deploying computing and network resources and storage in a cloud-based environment based on a temporal relationship are described. In one embodiment, for each node of a plurality of nodes which represents an element of a computer network, performance metric data corresponding to the node is received. The performance metric data describes one or more performance metrics of a particular computer network element corresponding to the node, based on a first time interval.

The plurality of nodes is organized in a tree structure which comprises a plurality of spine nodes, a plurality of leaf nodes, a plurality of host nodes, and a plurality of container nodes. In some embodiments, each leaf node is associated with one or more spine nodes and each host node is associated with one or more leaf nodes. Each container node is associated with a particular host computer of a plurality of host nodes on which the container node is running. Each container node represents a container application of a particular type of a computer using containerized operating system virtualization.

A recursive partitioning algorithm can be executed on the plurality of nodes using the metric data to generate an allocation strategy for the plurality of container nodes. The allocation strategy defines a topology of the tree structure that maximizes usage of computing resources on each node for the first time interval.

Figure 1:
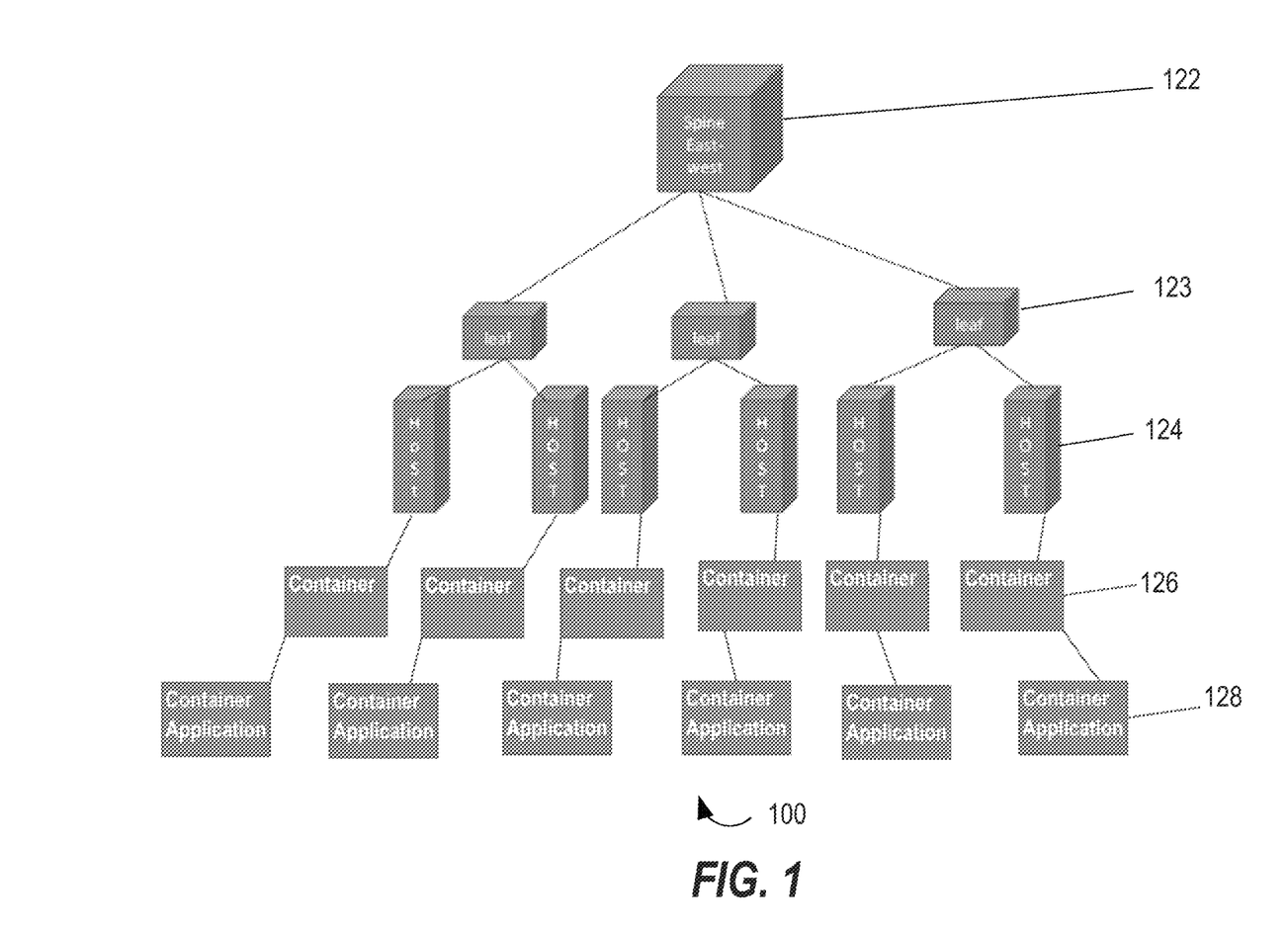
FIG. 1 illustrates an example tree structure of a hierarchical network architecture.

FIG. 1 illustrates an example tree structure of a hierarchical network architecture. The example tree structure 100 of FIG. 1 comprises a data structure stored in electronic digital computer memory and organized as one or more nodes representing internetworking infrastructure elements that are communicatively coupled within the computer network.

For example, a network as represented in tree structure 100 of FIG. 1 comprises a spine node 122, a plurality of leaf nodes 123, a plurality of host nodes 124, a plurality of container nodes 126 and a plurality of container applications 128 that is each represented by one or more container applications 126. For convenience, parts of this description may refer to nodes of the tree structure 100 and to corresponding internetworking infrastructure elements interchangeably.

Each internetworking element may comprise an interface compatible with the network. A spine node 122 is programmed to be a data center for one or more networks and is configured to collect traffic flow information between nodes within the network. Deployment of application programs can be performed in a way that minimize the traffic through the spine node 122. The spine node 122 may be associated with one or more leaf nodes 123.

In some embodiment, a leaf node 123 represents a virtual switch that is directly connected to the spine node 122. The leaf node 123 may implement a logical collection of virtual ports and configured to manage communication on the network. The leaf node 123 can process, switch and route traffic on a specific compute node. In some cases, the leaf node 123 can be a physical switch. The leaf node 123 may be associated with one or more host nodes 124.

In some embodiments, a host node 124 can be a specific tenant or client computer and can be directly connected to the leaf node 123. The host node 124 may include an interface that is compatible in a particular host computer and may be associated with an end user of the particular host computer. The host node 124 may be associated with one or more container nodes 126.

In some embodiments, a container node 126 can be a virtualized container which can be implemented using operating systems virtualization technologies such as DOCKER or KUBERNETES, or a Virtual Machine (VM) or virtual computing instance. The container node 126 may be directly connected to the host node 124 and may be associated with a particular host computer of the plurality of host nodes 124 on which the container node 126 is running. Each container node 126 may represent a container application 128 of a particular type of a computer using the containerized operating system. Various types of container applications 128 such as web container applications or database container applications can be associated with a container node 126.

Figure 2:
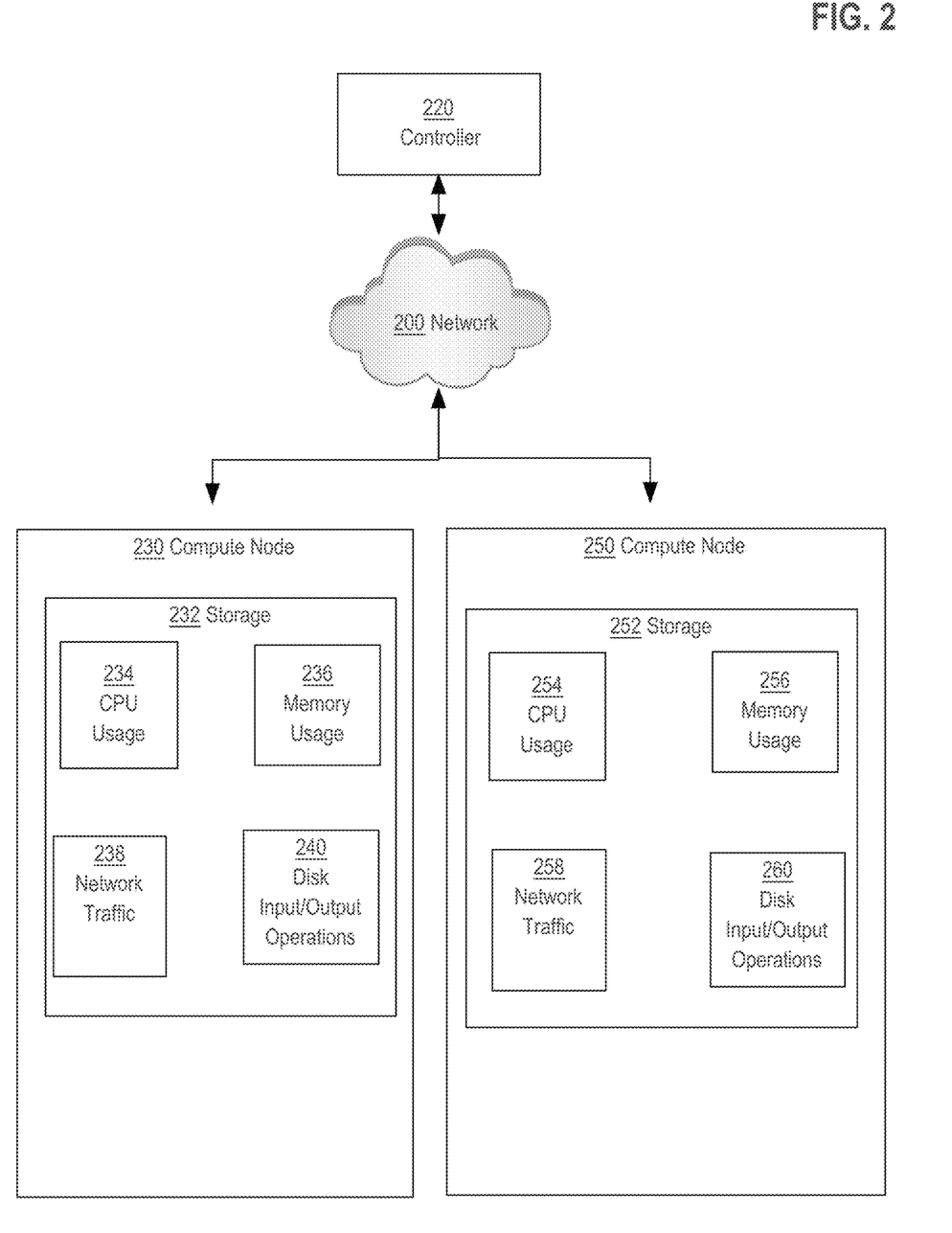
FIG. 2 illustrates an example diagram of a cloud system for deploying application programs based on a temporal relationship.

FIG. 2 is an example diagram of a cloud system for deploying application programs based on a temporal relationship. The example of FIG. 2 comprises a controller 220 and one or more compute nodes 230, 250 that are communicatively coupled via network 200.

Network 200 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 2. The various elements of FIG. 2 may also have direct (wired or wireless) communications links. The controller 220, and compute nodes 230, 250, and other elements of the system may each comprise an interface compatible with the network 200 and are programmed or configured to use standardized protocols for communication across the networks such as TCP/IP, and higher-layer protocols such as HTTP, TLS, and the like.

Each compute node 230, 250 includes a respective storage 232, 252, which may comprise electronic digital memory, non-volatile storage such as FLASH RAM, disk storage or other suitable digital storage. Compute nodes 230, 250 may be programmed to monitor, collect and store, in storage 232, 252, usage statistics information such as CPU usage 234, 254, memory usage 236, 256, network traffic 238, 258, and disk Input/output (I/O) operations 250, 260. The compute node 230 includes storage 232 that comprises performance metric data of a computer network element such as CPU usage 234, memory usage 236, network traffic 238, and disk I/O operation 240. Similarly, compute node 250 includes a storage 252 that comprises performance metric data of a computer network element such as CPU usage 254, memory usage 256, network traffic 258, and disk I/O operation 260. Each compute node 230, 250 is communicatively coupled to the controller 220 over the network 200. While two compute nodes 230, 250 are shown to illustrate a clear example, other embodiments may use any number of compute nodes each having the elements shown in FIG. 2 for compute nodes 230, 250.

The controller 220 is a computing element that may be programmed as a cloud administrator for one or more cloud networks. The controller 220 is programmed to perform cloud orchestration to manage the compute nodes and can assist integration of the compute nodes 230, 250. The controller 220 is configured or programmed to connect the compute nodes 230, 250 and collect metric data to dispatch application programs on the hosts.

For purposes of illustrating a clear example, the compute node 230 and its components have been described with certain functions, but the same operations can be performed using compute node 250 and others that may be used in a distributed computer system in a practical embodiment.

Collecting Usage Statistics Metric Data

The controller 220 is configured to collect usage statistics that are required for each type of container application 128. The usage statistics may comprise intra datacenter traffic metrics which can be collected based on a contract defined by the controller 220. For each level of the node, the contract can be defined by the controller 220.

In an embodiment, a contract describes communication and traffic information which specifies the application types that can be utilized to communicate with other application types. For example, the contract can specify that application type A may communicate with the application B and determine the traffic metric between the application A and the application B. As one example, the web server application may query the database application for the service capacity metrics and the controller 220 is configured to determine the data rate of the bandwidth that is available for the database application. The usage statistics also comprise metric data for network elements such as CPU usage 234, 254, memory usage 236, 256, network usage 238, 258, or disk I/O operations 240, 260. The other usage statistics of networking elements which are not listed herein can be collected as part of performance metrics of the computer network element.

Temporal Data

In one embodiment, the controller 220 is programmed to collect temporal data for each time period. The controller 220 is configured to receive traffic information in a data packet form. The data packet may include byte information such as sent bytes, received bytes, or dropped bytes for each node. For example, the controller 220 may receive temporal data for different time periods. An example period is twelve hours from noon to midnight. Based on the packet information, the controller 220 is programmed to define the node capacity for each time period and determine a temporal correlation. For example, a gaming application may be used more frequently after the normal business hours (e.g., after 6 pm) than during the normal business hours (e.g., 9 am to 6 pm) and may reach a peak at around 6 pm. Consequently, the controller 220 can determine that a greater number of nodes or a higher CPU load may be required to deploy the gaming application after 6 pm. Based on the collected metric data across the nodes for all time periods, the controller 220 may determine an average value for each temporal time period and determine an optimal temporal period that can become a constraint for the partitioning algorithm.

Balancing Constraints

The controller 220 is configured to calculate balancing constraints for each variable. The variables can be calculated based on each time period. For example, the variable CPUA1 can be calculated for the CPU load of the application A based on the time period t1 and the variable CPUB2 can be calculated for the CPU load of the application B based on the time period t2. Each variable includes networking element load information that is required to run a particular container application on the particular host computer.

In some embodiments, the sum of the variable CPUA1 and variable CPUB2 can be greater than the maximum CPU load that is allowed on the specific host computer. However, since the execution of each container application can occur at a different time period, scheduling these container applications at the respective peak times can be enabled. Partitioning can be performed based at least in part on the balancing constraints and the total capacity constraints of all the hosts. In one embodiment, the number of balancing constraints can be calculated by multiplying the number of metrics by the number of time variables.

Computation of Usage Statistics Metric Data

In order to compute the required computer network resources for each container application 128, the controller 220 is configured to calculate the average value of the usage statistics of each networking elements and compute the total number of containers that are needed for each type of container application. As one example, to avoid any idle time, the controller 220 may determine that the controller 220 needs n1 containers of application type A, n2 containers of application type B, n3 containers of application type C. Consequently, the controller 220 may determine that total number of elements that need to be distributed across all physical servers is n1+n2+n3.

Constraints

In some embodiments, the controller 220 is configured to determine an allocation strategy that maximizes the usage of computing resources based on the constraints associated with the nodes. Each node has its constraints that the workloads can be assigned to the nodes in a manner that the constraints are satisfied at every node in the hierarchical network architecture to minimize the traffic flow. For example, the controller 220 is configured to determine how much of the network capacity the leaf node 123 needs for a particular packet that transfers in and out of the leaf node 123, how much of the CPU capacity and the memory capacity the host node 124 is associated with, or how much of the I/O the host node 124 can support. Based on the network capacity of each node, the controller 220 is configured to assign the workload to optimize the traffic flow and generate the allocation strategy for each node. When the constraints are satisfied, redeployment of the workload to the lower level node (e.g., host node 124 to container node 126) can be facilitated.

Recursive Partitioning Algorithm

To generate an optimized allocation strategy, a recursive partitioning algorithm can be implemented. The recursive partitioning algorithm is a time-aware multi-level balanced partitioning algorithm that partitions the total workload into the nodes based on the hierarchical network architecture. For example, the partitions can be performed at every node level of the hierarchical network architecture to minimize the total number of data flow to the spine node 122 and the leaf nodes 123.

The recursive partitioning algorithm can be performed using the performance metric data. In one embodiment, k-way partitioning algorithm may be used as a recursive partitioning algorithm. For example, constraints for each networking elements (e.g., CPU, memory, I/O) can be determined and the sum of the constraints for each networking elements of all the physical hosts that are connected to the leaf node 123 can be calculated. The network traffic between the nodes can be calculated from the collected contract statistics. The constraints are aggregated from the hosts and partitioning can be performed across different switches before partitioning between hosts.

In some embodiment, Fiduccia Mattheyses partitioning algorithm can be used as a recursive partitioning algorithm to generate the allocation strategy for the nodes. The Fiduccia Mattheyses partitioning algorithm is a basic linear time partitioning algorithm that runs multiple iterations based on the number of nodes. The initial execution of the Fiduccia Mattheyses partitioning algorithm can be performed with coarse granularity time period (e.g., one day) and the following execution of the Fiduccia Mattheyses partitioning algorithm can be performed with finer granularity (e.g., one hour) until it reaches the preferred granularity. The Fiduccia Mattheyses partitioning algorithm can be performed multiple times based on the number of nodes. In some embodiments, the Fiduccia Mattheyses partitioning algorithm can be performed with fine granularity as an hour period. Although the k-way partitioning algorithm and Fiduccia Mattheyses partitioning algorithm have been used to illustrate a clear example, other algorithms which can reduce the run time of the algorithms may be used in other embodiments.

In some embodiments, spectral partitioning or graph partitioning algorithm different from the Fiduccia Mattheyses partitioning algorithm or k-way partitioning algorithm can be implemented to generate an optimized allocation strategy. In another embodiment, an integer linear programming method can be implemented. The balancing constraints for the integer linear programming method can include 'N' different equations for 'N' different time periods. The cost equation can be network data traffic between nodes and assigning workloads to nodes may require satisfying all the constraint equations.

Allocation Strategy

The recursive partitioning can be performed at different levels of nodes. As one example, the recursive partitioning can be performed at the spine node 122 level. The controller 120 is configured or programmed to divide container applications 128 among different switches, in that the peak data among every time points can be minimized subject to networking element constraints. The constraints can be the sum of all the networking resources of all physical servers connected to the leaf node 123. In another example, the recursive partitioning can be performed at the leaf node 123 level. For example, the controller 120 is configured or programmed to divide the container application 128 among different physical servers under each switch. In another example, the recursive partitioning can be performed at the host node 124 level. The controller 120 is configured or programmed to divide container applications 128 among each virtual machine.

In another embodiment, the partitioning algorithm may predict the future usage of the nodes based on the past usage using a Long Short Term (LST) memory. Before the container applications 128 are deployed, the controller 220 can generate statistics data which predicts the values for the future demand and the future usage on the nodes. Consequently, the need to redeploy the container applications can be reduced based on the prediction of future usage of the nodes.

3. Example Processes and Algorithms

Figure 3A:
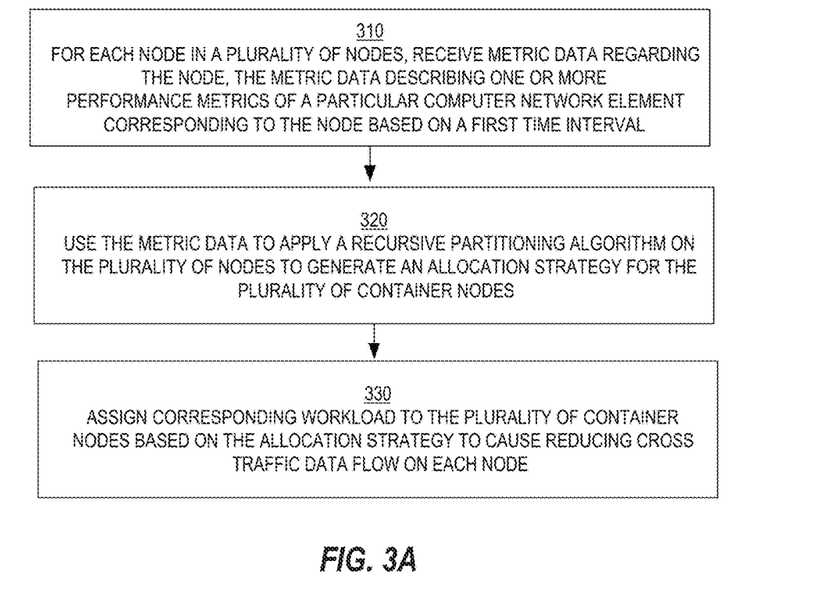
FIG. 3A illustrates an example method for allocating strategy defining a topology of the tree structure that maximizes the usage of computing resources based on a first time interval.

FIG. 3A illustrates an example flow diagram of a process for assigning workload to a plurality of container nodes based on the allocation strategy based on a first time interval. FIG. 3A is intended to disclose an algorithm or functional description that may be used as a basis of writing computer programs to implement the functions that are described herein, and which cause a computer to operate in the new manner that is disclosed herein. The steps of the process may be performed in any order and are not limited to the order shown in FIG. 3A. In an embodiment, controller 120 is programmed to execute the operations of FIG. 3A.

At step 310, communication with the controller 120 begins. For example, for each node in a plurality of nodes, the controller 120 receives metric data regarding the node based on a first time interval. The metric data describes one or more performance metrics of a particular computer network element corresponding to the node. The plurality of nodes is organized in a tree structure which comprises a plurality of spine nodes, a plurality of leaf nodes, a plurality of host nodes, and a plurality of container nodes.

Each leaf node is associated with one or more spine nodes of the plurality of spine nodes. Each host node is associated with one or more leaf nodes of the plurality of leaf nodes. Each container node of the plurality of container nodes represents a container application of a particular type of a computer using containerized operating system virtualization. Each container node of the plurality of container nodes is associated with a particular host computer of the plurality of host nodes on which the container node is running.

In step 320, the process executes a recursive partitioning algorithm on the plurality of nodes using the metric data to generate an allocation strategy for the plurality of container nodes. The allocation strategy defines a topology of the tree structure that maximizes usage of computing resources on each node based on the first time interval. In some embodiment, the recursive partitioning algorithm is configured to be performed by a separate controller different than the controller 120.

In step 330, the process is configured to assign the corresponding workload to the plurality of container nodes based on the allocation strategy to cause reducing cross traffic data flow on each node. Thus, the result of FIG. 3A may comprise reconfiguring a computer system, or multiple computer systems and/or virtual computing instances, other than the computer system that is executing the process of FIG. 3A.

Figure 3B:
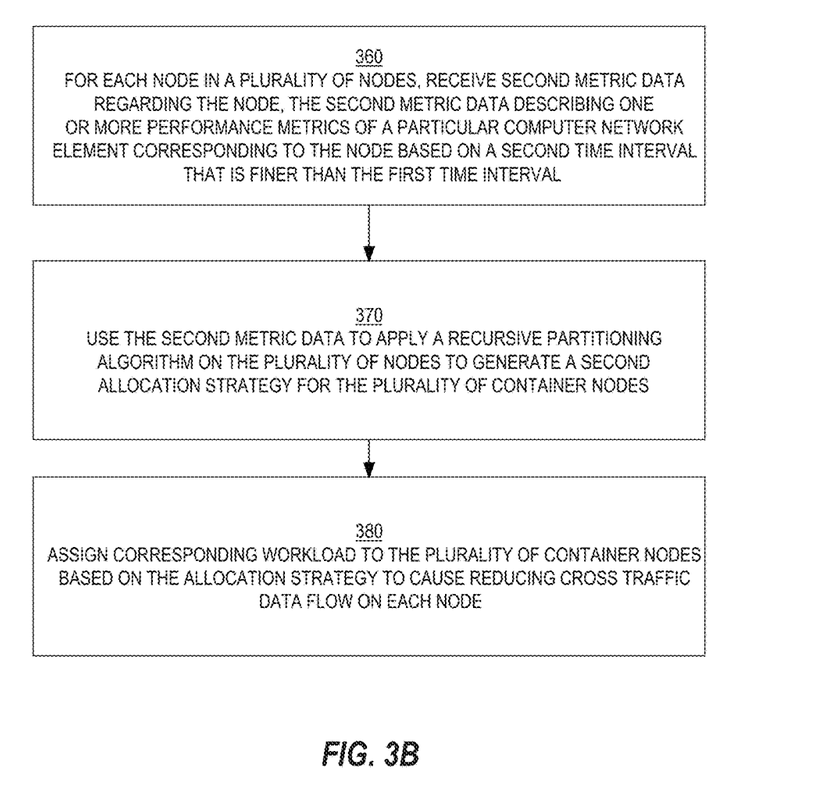
FIG. 3B illustrates an example method for allocating strategy defining a topology of the tree structure that maximizes the usage of computing resources based on a second time interval.

FIG. 3B illustrates an example flow diagram of a process for assigning workload to a plurality of container nodes based on a second allocation strategy based on a second time interval with finer granularity than the first time interval. FIG. 3B is intended to disclose an algorithm or functional description that may be used as a basis of writing computer programs to implement the functions that are described herein, and which cause a computer to operate in the new manner that is disclosed herein. The steps of the process may be performed in any order and are not limited to the order shown in FIG. 3B.

In an embodiment, controller 120 is programmed to execute the operations of FIG. 3B. At step 360, communication with the controller 120 begins. For example, for each node in a plurality of nodes, the controller 120 receives second metric data regarding the node based on a second time interval that is finer than the first time interval. The second metric data describe one or more performance metrics of a particular computer network element corresponding to the node.

In step 370, the process executes a recursive partitioning algorithm on the plurality of nodes using the metric data to generate a second allocation strategy for the plurality of container nodes. The second allocation strategy defines a topology of the tree structure that maximizes usage of computing resources on each node based on the second time interval.

In step 380, the process is configured to assign the corresponding workload to the plurality of container nodes based on the second allocation strategy to cause reducing cross traffic data flow on each node. Step 330 may comprise, for example, controller 120 creating in digital storage at least transiently, and then transmitting to compute node 230 and/or compute node 250, configuration instructions that are programmed to cause the cloud computing facility to assign computer processing workload to a particular one or more container nodes. Thus, the result of FIG. 3A may comprise reconfiguring a computer system, or multiple computer systems and/or virtual computing instances, other than the computer system that is executing the process of FIG. 3A.

In some embodiments, the metric data comprises CPU usage of the node, memory usage of the node, network traffic of the node, or disk Input/Output (I/O) operations of the node. In one embodiment, the recursive partitioning algorithm can be a k-way partitioning algorithm. In another embodiment, the recursive partitioning algorithm can be a Fiduccia Mattheyses partitioning algorithm.

Using these approaches, workloads may be efficiently assigned to different physical servers using a separate computer or process that is programmed to use metric data for periods of time in a specified way, via a time-aware, recursive multilevel k-way partitioning process. These approaches have the benefit of minimizing total network traffic through a spine and switches while taking into account constraints of host computers or network switches. Using time-dependent constraint satisfaction prevents over-utilization or under-utilization of networking resources and/or computing resources. Furthermore, the use of recursive partitioning avoids the drawbacks of other methods that partition based on lower-level switches. The present approach recognizes that optimization is best performed for cross-traffic data flows, so that traffic through the spine of a network should be minimized. To do so, the approaches herein can aggregate constraints from hosts to one level above the spine, at the switch level, and partition loads across different switches first before partitioning among hosts. The approach disclosed herein can permit highly efficient workload distribution, for example, in which a particular workload uses all available resources of a particular host in a first time period and a different workload also uses all available resources of the same host in a different time period.

4. Implementation Mechanisms-Hardware Overview

Figure 4:
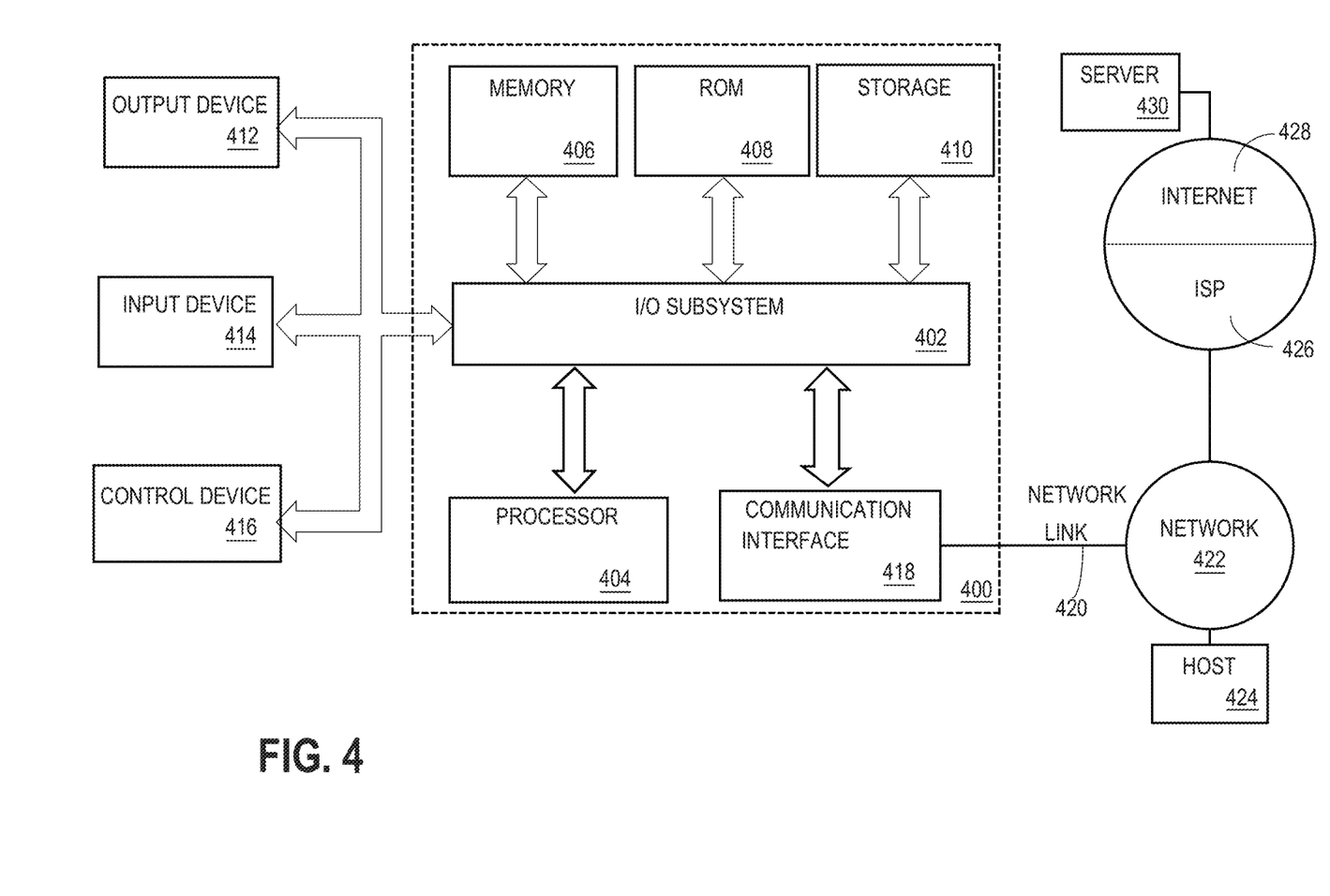
FIG. 4 illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method, comprising:
    by a computing device, creating and storing in electronic digital computer memory, a tree structure comprising a plurality of nodes that represent elements of a computer network, the nodes comprising a plurality of spine nodes, a plurality of leaf nodes, a plurality of host nodes, and a plurality of container nodes, each leaf node being associated with one or more spine nodes of the plurality of spine nodes, each host node being associated with one or more leaf nodes of the plurality of leaf nodes, each container node of the plurality of container nodes representing a container application of a particular type of a computer using containerized operating system virtualization, each container node of the plurality of container nodes being associated with a particular host computer of the plurality of host nodes on which the container node is running;
    by the computing device, for each of the nodes, receiving metric data describing one or more performance metrics of a particular computer network element corresponding to the node, for a first time interval;
    by the computing device, using the metric data to apply a recursive partitioning algorithm on the plurality of nodes to generate an allocation strategy for the plurality of container nodes, the allocation strategy defining a topology of the tree structure that maximizes usage of computing resources on each node based on the first time interval;
    by the computing device, creating and transmitting instructions to another computing node to cause assigning corresponding workload to the plurality of container nodes based on the allocation strategy to cause reducing cross traffic data flow on each node;
    wherein the method is performed using one or more computing devices.

2. The computer-implemented method of claim 1, wherein the metric data comprises any of CPU usage of a node, memory usage of the node, network traffic of the node or disk input and output (I/O) operations of the node.

3. The computer-implemented method of claim 1, further comprising:
    by the computing device, calculating a sum of the metric data of the plurality of nodes connected to a particular leaf node by aggregating the metric data of the plurality of nodes connected to the particular leaf node;
    wherein generating the allocation strategy for the plurality of container nodes is based on the sum of the metric data of the plurality of nodes connected to the particular leaf node.

4. The computer-implemented method of claim 1, wherein generating the allocation strategy for the plurality of container nodes is based on a number of nodes connected to the particular leaf node.

5. The computer-implemented method of claim 1, further comprising:
    by the computing device, partitioning, using the recursive partitioning algorithm, a corresponding workload to the plurality of leaf nodes;
    by the computing device, partitioning, using the recursive partitioning algorithm, a corresponding workload to the plurality of host nodes, wherein the partitioning the corresponding workload to the plurality of leaf nodes is performed before the partitioning the corresponding workload to the plurality of host nodes.

6. The computer-implemented method of claim 1, wherein the recursive partitioning algorithm is a k-way partitioning algorithm.

7. The computer-implemented method of claim 1, wherein the recursive partitioning algorithm is a Fiduccia Mattheyses partitioning algorithm.

8. The computer-implemented method of claim 7, further comprising:
by the computing device, executing the Fiduccia Mattheyses partitioning algorithm at a first time period;
after the Fiduccia Mattheyses partitioning algorithm is executed at the first time period, executing Fiduccia Mattheyses partitioning algorithm at a second time period, wherein the first time period is a coarser granularity time period than the second time period.

9. The computer-implemented method of claim 1, wherein the recursive partitioning algorithm is performed by a separate controller.

10. The computer-implemented method of claim 1, further comprising:
receiving second metric data regarding the node, wherein the second metric data describes one or more performance metrics of a particular computer network element corresponding to the node based on a second time interval that is finer than the first time interval;
using the second metric data to apply the recursive partitioning algorithm on the plurality of nodes to generate a second allocation strategy for the plurality of container nodes;
wherein the second allocation strategy defines the topology of the tree structure that maximizes usage of computing resources on each node based on the second time interval; and
assigning corresponding workload to the plurality of container nodes based on the second allocation strategy to cause reducing cross traffic data flow on each host node.

11. A system comprising:
one or more processors;
a memory communicatively coupled to the one or more processors storing instructions which, when executed by the one or more processors, cause the system to:
create and store in electronic digital computer memory, a tree structure comprising a plurality of nodes that represent elements of a computer network, the nodes comprising a plurality of spine nodes, a plurality of leaf nodes, a plurality of host nodes, and a plurality of container nodes, each leaf node being associated with one or more spine nodes of the plurality of spine nodes, each host node being associated with one or more leaf nodes of the plurality of leaf nodes, each container node of the plurality of container nodes representing a container application of a particular type of a computer using containerized operating system virtualization, each container node of the plurality of container nodes being associated with a particular host computer of the plurality of host nodes on which the container node is running;
for each of the nodes, receive metric data describing one or more performance metrics of a particular computer network element corresponding to the node, for a first time interval;
use the metric data to apply a recursive partitioning algorithm on the plurality of nodes to generate an allocation strategy for the plurality of container nodes, the allocation strategy defining a topology of the tree structure that maximizes usage of computing resources on each node based on the first time interval; and
create and transmit instructions to another computing node to cause assigning corresponding workload to the plurality of container nodes based on the allocation strategy to cause reducing cross traffic data flow on each node.

12. The system of claim 11, wherein the metric data comprises any of CPU usage of the node, memory usage of a node, network traffic of the node, or disk input and output (I/O) operations of the node.

13. The system of claim 11, wherein the instructions further cause the system to:
calculate a sum of the metric data of the plurality of nodes connected to a particular leaf node by aggregating the metric data of the plurality of nodes connected to the particular leaf node;
wherein generating the allocation strategy for the plurality of container nodes is based on the sum of the metric data of the plurality of nodes connected to the particular leaf node.

14. The system of claim 11, wherein generating the allocation strategy for the plurality of container nodes is based on a number of nodes connected to the particular leaf node.

15. The system of claim 11, wherein the instructions further cause the system to:
partition, using the recursive partitioning algorithm, a corresponding workload to the plurality of leaf nodes;
partition, using the recursive partitioning algorithm, a corresponding workload to the plurality of host nodes, wherein partitioning the corresponding workload to the plurality of leaf nodes is performed before partitioning the corresponding workload to the plurality of host nodes.

16. The system of claim 11, wherein the recursive partitioning algorithm is a k-way partitioning algorithm.

17. The system of claim 11, wherein the recursive partitioning algorithm is a Fiduccia Mattheyses partitioning algorithm.

18. The system of claim 11, wherein the instructions further cause the system to:
receive second metric data regarding the node, wherein the second metric data describes one or more performance metrics of a particular computer network element corresponding to the node based on a second time interval that is finer than the first time interval;
use the second metric data to apply the recursive partitioning algorithm on the plurality of nodes to generate a second allocation strategy for the plurality of container nodes;
wherein the second allocation strategy defines the topology of the tree structure that maximizes usage of computing resources on each node based on the second time interval; and
assign corresponding workload to the plurality of container nodes based on the second allocation strategy to cause reducing cross traffic data flow on each host node.

19. The system of claim 11, wherein the recursive partitioning algorithm is performed by a separate controller.

20. One or more non-transitory computer-readable media storing instructions, wherein the instructions, when executed by one or more processors, cause to:
create and store in electronic digital computer memory, a tree structure comprising a plurality of nodes that represent elements of a computer network, the nodes comprising a plurality of spine nodes, a plurality of leaf nodes, a plurality of host nodes, and a plurality of container nodes, each leaf node being associated with one or more spine nodes of the plurality of spine nodes, each host node being associated with one or more leaf nodes of the plurality of leaf nodes, each container node of the plurality of container nodes representing a container application of a particular type of a computer using containerized operating system virtualization, each container node of the plurality of container nodes being associated with a particular host computer of the plurality of host nodes on which the container node is running;

for each of the nodes, receive metric data describing one or more performance metrics of a particular computer network element corresponding to the node, for a first time interval;

use the metric data to apply a recursive partitioning algorithm on the plurality of nodes to generate an allocation strategy for the plurality of container nodes, the allocation strategy defining a topology of the tree structure that maximizes usage of computing resources on each node based on the first time interval; and create and transmit instructions to another computing node to cause assigning corresponding workload to the plurality of container nodes based on the allocation strategy to cause reducing cross traffic data flow on each node.

* * * * *